United States Patent
Boontje

[11] 3,837,812
[45] Sept. 24, 1974

[54] ROTATING DISC CONTACTOR
[75] Inventor: Jan Th. Boontje, Santpoort, Netherlands
[73] Assignee: Verenigde Kunstmestfabrieken Mekog-Albatros N.V., Utrecht, Netherlands
[22] Filed: Apr. 25, 1972
[21] Appl. No.: 247,416

Related U.S. Application Data
[63] Continuation-in-part of Ser. No. 889,097, Dec. 30, 1969.

[52] U.S. Cl................. 23/273 R, 23/270.5, 23/270, 23/283
[51] Int. Cl.......................... B01d 9/02, B01d 11/02
[58] Field of Search ........... 23/273 F, 270.5, 273 R, 23/283, 270

[56] References Cited
UNITED STATES PATENTS

| | | | |
|---|---|---|---|
| 1,880,925 | 10/1932 | Eissner | 23/273 F |
| 2,601,674 | 6/1952 | Reman | 23/270.5 |
| 2,729,545 | 1/1956 | Reman | 23/270.5 |
| 2,904,518 | 9/1959 | Shea | 23/270 R |
| 2,912,310 | 11/1959 | Walley | 23/270.5 |
| 3,071,450 | 1/1963 | Martin | 23/312 AH |
| 3,318,805 | 5/1967 | Hess | 23/270.5 |
| 3,410,923 | 11/1968 | Strand | 23/270.5 |
| 3,547,595 | 12/1970 | Olivier | 23/273 R |

OTHER PUBLICATIONS
Brink, The South African Industrial Chemist, Nov., 1964, pp. 152 thru 154.

*Primary Examiner*—Norman Yudkoff
*Assistant Examiner*—S. J. Emery

[57] ABSTRACT

A rotating disc contactor comprising two cylindrical shells of different diameter in open connection to each other, the wider one situated on top of the narrower one and both provided with annular stationary baffles and disc-like rotor baffles, each of which rotor baffles being located between two annular stationary baffles and mounted on a shaft. The apparatus is useful for carrying out chemical reaction between substances dissolved in liquids resulting in solid precipitates (for instance, chemical reactions between ions resulting in crystalline precipitates) and washing the precipitates. Whereas the reaction and the crystallization are caused to take place within the wider shell, the coarser particles of the product are allowed to sink through an upward current of washing liquid in the narrower shell.

10 Claims, 4 Drawing Figures

3,837,812

ROTATING DISC CONTACTOR

RELATED APPLICATIONS

This application is a continuation-in-part of Ser. No. 889,097, filed on Dec. 30, 1969.

The invention relates to a contactor with rotating discs.

Contacting apparatus having a stationary cylindrical shell with a plurality of stationary annular baffles extending from the shell wall to a central opening and a plurality of discs mounted on a rotating shaft extending through the central openings in the stationary annular baffles is known, for instance, from U.S. Pat. No. 2,601,674. Such an apparatus is used for contacting two or more liquids that are at least in part immiscible, for instance for the purpose of solvent extraction of liquid mixtures.

The contactor of the present invention is of a special design and it is suitable in particular for contacting miscible liquids so as quickly to form a more or less homogeneous liquid phase, thereby promoting chemical reactions between substances dissolved in the miscible liquids or between ions of such substances; for contacting a liquid phase which is super-saturated with respect to a crystallizable substance with crystals of that substance causing said crystals to grow; and for contacting particles of solid product obtained in said chemical reactions, or crystals, with an ascending current of washing liquid in which current the solid particles or crystals sink down.

In the preparation of crystalline precipitates in conventional processes it was often difficult to control the crystallization satisfactorily. Usually a product with a broad spectrum of particle sizes was obtained. Another problem was in the purification of the crystalline precipitates; separating the crystal mass from the liquid phase, treating it with a washing liquid and separating it from the washing liquid is quite a cumbersome cycle, the more so since often several repetitions are necessary.

It is an object of the present invention to provide a rotating disc contactor of special design, offering favourable conditions for well controlled crystallization of solid substances from liquids.

It is a further object of the present invention to provide an apparatus for mixing liquids containing substances or ions which as a result of said mixing react with each other, thereby yielding solid precipitates.

A still further object of the present invention is to provide a rotating disc contactor suitable for carrying out crystallization processes and controlling such processes in such a way that a product of substantially uniform crystal size is obtained.

Another object of the present invention is to provide an apparatus in which a solid precipitate can be obtained and subsequently washed without intermediate separation of the solid mass from the liquid phase in which it has been obtained.

More objects of the invention will be apparent as this description proceeds.

The apparatus of the present invention briefly comprises two substantially cylindrical stationary tubes or shells of different internal diameter, arranged substantially vertically, the wider one narrowing at its bottom so as to fit to the top of the narrower one, the bottom of the wider tube or shell being in open connection to the top of the narrower tube or shell. The parts of the space inside both shells forming the actual contacting zones are subdivided into a plurality of compartments by stationary annular baffles or rings having central openings. Further, there are in each shell rotor baffles or discs, one in each compartment, fixed on a shaft extending through the openings of the stationary annular baffles. The rotor baffles or discs inside both shells may be mounted on one and the same shaft extending through the space inside both shells. Alternatively, the rotor baffles or discs inside each separate shell may be mounted on a separate shaft. There are means for introducing fluid into the wider shell and into the narrower shell; means for discharging material at the bottom of the narrower shell and in the upper region of the wider shell; and means for rotating said rotor shaft or shafts and rotor baffles.

Preferably, the shells are arranged coaxially, the axis of the one being the production of the axis of the other. A parallel displacement of one axis with respect to the other, over a short distance, however, is possible.

Usually, the position of the shaft or shafts is axial with respect to the surrounding cylindrical shells. If use is made of two separate shafts, the one on which the rotor baffles of the wider shell are mounted may be hollow and arranged coaxially around part of the axis to which the rotor baffles of the narrower shell are fixed. If two separate shafts are used separate means are provided for rotating each of them; the speed of each shaft may be adapted separately to requirements.

Usually, the compartments in each separate shell are substantially identical in size and shape. The compartments of one shell, however, may be very different in size and shape from those of the other shell.

Usually, the stationary annular baffles extend horizontally from the shell wall to the central opening. As an alternative, however, a frusto-conical shape of the stationary annular baffles is possible, the apex of the cone, preferably, pointing downward.

It is necessary for the desired effect that there is axially a substantial distance between a rotor baffle or disc and the nearest stationary baffle. Usually a rotor baffle or disc is located at a level approximately half-way between the levels of the nearest stationary baffles above and under it.

The construction of the apparatus according to the invention will be further illustrated with reference to the accompanying drawing forming a part of this specification and illustrating certain preferred embodiments, wherein FIG. 1 is a section on a vertical plane;

Figure 1:
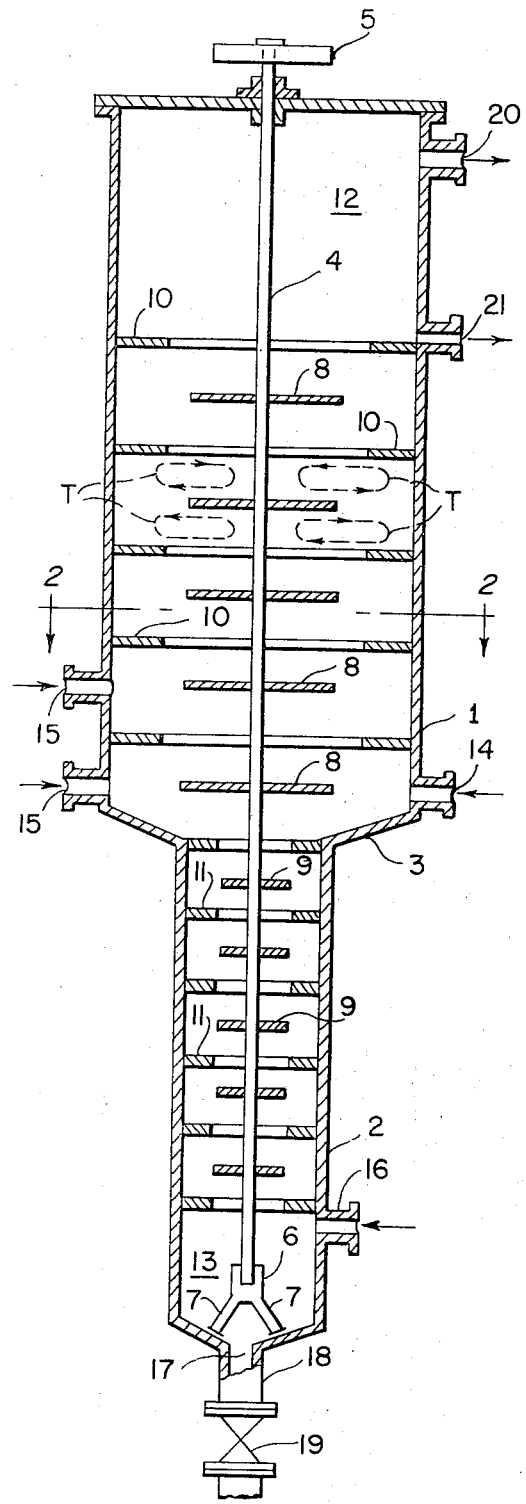
Figure 2:
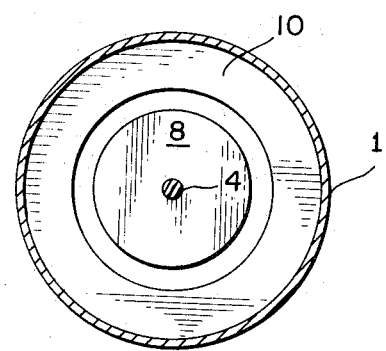
FIG. 2 is a section on line 2-2 of FIG. 1.

Referring to FIGS. 1 and 2, the apparatus comprises a vertical shell or tube 1 of circular cross-section and cylindrical shape and a vertical shell or tube 2 also of circular cross-section and cylindrical shape. Shell 2 is of narrower diameter than shell 1. Between the bottom of shell 1 and the top of shell 2 a frustoconical connecting piece or shell 3 is fitted providing an open connection between the inner space in shell 1 and the inner space in shell 2. There is a rotor shaft 4 coaxial with shells 1 and 2, journalled at its ends for rotation and having a pulley 5 by which it may be rotated by a drive belt, not shown. At its lower end the shaft 4 is secured by a bearing 6, which is supported by legs 7, fixed to the wall of shell 2. A plurality of circular baffles 8 and 9 (also called rotor discs) are fixed to the rotor shaft 4 for rotation therewith with their plane surfaces perpendicular to the shaft axis. They are made of thin flat sheet-metal. The circular baffles 8 which are of larger diameter than baffles 9 are located within shell 1, the circular baffles 9 are located within shell 2. The inner wall of shells 1 and 2 is equipped with annular horizontal stationary baffles (also called stator rings) 10 and 11, likewise made of thin flat sheet-metal and having circular central openings concentric with the cross-section of the shell wall to which they are fixed. The stator rings 10 located within shell 1 are wider in inner diameter than stator rings 11 located within shell 2. The stator rings 10 and 11 are, preferably, located so that they are vertically approximately in the middle between adjacent rotor baffles. The stationary baffles thereby subdivide the space within the shells into a vertical series of compartments, the height of which is determined by the vertical interval between stationary baffles. Stator rings and rotor baffles are, preferably, not mounted in the upper region of shell 1, leaving a settling zone 12 in which a quiet flow pattern may develop. A settling zone or thickening zone devoid of rotor discs and stator rings may also be provided at 13 in the lower region of shell 2. It may be advantageous to make the settling zones 12 and 13 of wider diameter than the adjacent compartments, so as to promote settling of solid particles. The settling zones 12 and 13 are not essential in the present invention since use might be made of external settlers. Further, there are provided inlet ports 14 and 15 in the wall of shell 1 for the introduction of liquids carrying interacting ingredients. The number of separate inlet ports in shell 1 should be at least 2, that is one for each liquid. Generally, a higher number of inlet ports, located in various compartments should be preferred. In the wall of shell 2 one or more inlet ports 16 are provided, only one of which is shown. A discharge opening 17 for fluid and liquid material is provided at the bottom of shell 2, connecting with draw-off pipe 18 with valve 19. Discharge openings 20 and 21 for liquid are provided in the upper region of shell 1. Although one discharge opening 20 could be sufficient, often both openings 20 and 21 are provided. There may be more discharge openings in this part of the apparatus at same level or at various levels.

The pattern of flow of liquid through the apparatus may be described as follows.

The centrifugal forces caused by the rotation of the rotor discs induce a flow of liquid from a rotor shaft radially or spirally outwards towards the shell wall. The flow of liquid hitting the wall is deflected partly upward and partly downward and the deflected currents will subsequently meet stationary baffles which induce them to deflect again, this time to continue radially inward. Thus, the motion of the liquid phase as far as provoked by the rotating rotor discs is toroidal, as indicated by the lines T in FIG. 1. Apart from the toroidal flow pattern that is provoked in duplicate in every compartment (that is above and under each rotor disc) there is a motion of liquid induced by the introduction of liquid through various inlet ports. The latter motion results in a gradial displacement of liquid through the successive compartments and upward currents in the openings in the stationary baffles. Whereas the toroidal motion of the liquid is vigorous and fast the upward displacement in comparison is small. Yet in the toroidal flow pattern, as far as the liquid is concerned, the upward currents dominate over the downward currents, the net result being an upward displacement of liquid.

The motion of solid crystal particles is governed in part by the pattern of liquid flow and in part by gravity. Small crystals will be carried upward, whereas large crystals will sink down counter to the upward currents of liquid and gradually move through the successive compartments of both shells in downward direction.

As stated hereinbefore, the apparatus of the present invention is used in the manufacture of solid chemical products. Liquids containing reactive ingredients in solution are introduced through separate inlet ports into the reaction or crystallization zone, that is in the wider cylindrical shell of the apparatus. The liquids are mixed quickly and a chemical reaction between the reactive ingredients results, yielding a solid precipitate. The liquids introduced may be, for instance, sulphuric acid and an aqueous solution containing calcium ions; a crystalline precipitate of calcium sulphate results. The liquid in the lower region of the wider shell contains a large amount of crystalline product in suspension. A favourable consequence is that high super-saturation is avoided and that the growing of existing crystals is dominating strongly with respect to the formation of new nuclei.

The ascending currents in the apparatus cause fine crystals to rise. Whilst moving upward the crystals grow, so that they are following the ascending currents less and less, and finally start to sink contrary to the ascending liquid. They continue their growth sinking through successive compartments and finally sink from the wider shell into the narrower shell, where they are contacted with washing liquid and where their growth stops in the absence of crystallizable material in super-saturation. Thus, the upward currents provide for a classification of crystals according to their size. The product dropping into the narrower shell is of very uniform particle size and may be very coarse, if desired.

It depends upon the upward velocity of the liquid what particle size will predominate in the product. The upward velocity can be controlled by suitably adjusting the supply of liquids, including the supply of washing liquid in the narrower shell. The velocity of the vertical displacement of liquid in the wider shell should also be controlled so as to ensure that the duration of residence of the mixture in the wider shell is sufficient for reaction and crystallization, but this is not a serious problem, if the number of compartments inside the wider shell is sufficient.

Fine crystals emerging above the highest situated stationary baffle for a greater part will settle from the mother lye in the settling zone in the upper region of the wider shell. It may be very useful to recirculate part of the mother lye containing fine crystals to inlet ports at lower levels of the wider shell. The fines reintroduced into the liquid mixture in the wider shell will serve as nuclei for crystallization. In the apparatus of FIG. 1 mother lye still containing fine crystal may be drained off from the wider shell through discharge opening 21 at the bottom of the settling zone 12. It may be recirculated to inlet port 14 through a recirculation line not shown. In the recirculation line a vessel may be arranged suitable for the dissolution of fresh initial material into the recirculating mother lye.

The sizes of the crystals which are removed from the wider shell to the narrower one are usually between 0.05 and 0.5 mm. The content of solid material at the bottom in the wider shell is usually between 5 and 20 percent by volume. At a rate of settling of 1 to 2 cm/sec. an apparatus of 1m diameter may have a production of the order of magnitude of 10,000 to 20,000 kg crystal per hour.

In the narrower shell the crystalline product is intensely contacted with washing liquid introduced at the bottom of the narrower shell. The crystals move gradually through the successive compartments downward to the discharge port at the bottom. The washing liquid gradually ascends through the successive compartments of the narrower shell. It removes rests of the reactive ingredients or initial materials from the crystals and also entrains fine crystals if still present. Finally, the washing liquid enters into the wider shell to form part of the liquid mixture there.

The upward linear velocity calculated as an average on the total surface of the cross-section is usually not equal in both shells. Often it is in the narrower shell much lower than in the wider shell.

As it is necessary to concentrate the crystalline product in the course of the process and to keep the amount of washing liquid low in comparison to the amounts of liquid involved in the process as a whole, the diameter of the washing zone must be smaller than that of the reacting and crystallizing zone. Usually a relative proportion of diameters of both zones between 2:1 and 5:1 is satisfactory. Therefore, the relative proportion of diameters of the wider and the narrower shell are usually selected between the same limits.

The number of compartments in each section or shell is usually between 3 and 25. The relative proportion of height to diameter of a compartment is usually between 1:1 and 1:10, preferably between 1:2 and 1:5. The relative proportion of diameter of rotor discs and internal diameter of the shell is usually between 2:10 and 9:10. The relative proportion of internal diameter of stator rings and shell is usually between 2:10 and 9:10. The number of rotations of the shaft or shafts is usually between 50 and 2,000 per minute.

For easier construction, cleaning, inspection and repair it is recommended to use rotor baffles within each shell of diameters smaller than the inner diameter of the annular stationary baffles of that shell and to make the diameters of all rotor baffles smaller than the inner diameter of the annular stationary baffles in the wider shell. If these conditions are observed it is possible to insert or to remove the rotor assembly, consisting of rotor shaft or shafts and rotor baffles, through the openings in the stator rings.

Within the scope of the invention is also an apparatus comprising three substantially cylindrical shells of different diameter arranged substantially vertically and in vertical succession, the diameters of the successive shells increasing from the lowest situated to the highest situated shell. The shells are united in a way similar to that in the apparatus described hereinbefore, by frustoconical connections or by narrowing connections of other shape. Stator rings and rotor discs are mounted in all three shells in complete analogy to the situation described hereinbefore with respect to the apparatus comprising two cylindrical shells.

Figure 3:
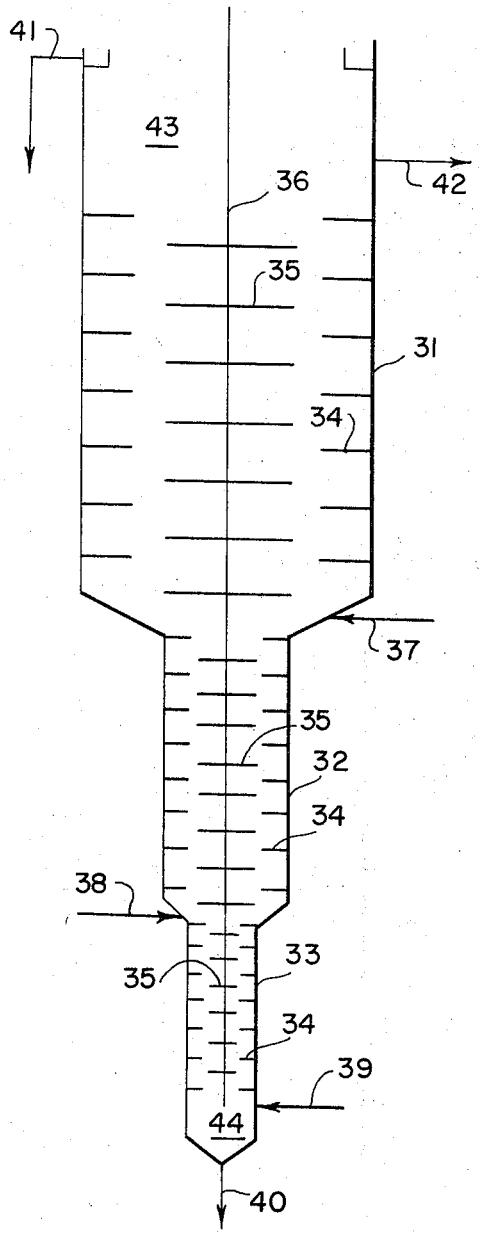
FIG. 3 is a schematic diagram relating to a special embodiment of the present invention described herein further.

The apparatus comprising three cylindrical shells is represented in a preferred embodiment diagrammatically in FIG. 3.

Referring to FIG. 3 the apparatus comprises a reaction and crystallization section (or shell) 31, a diluting section (or shell) 32 and a washing section (or shell) 33.

There are substantially horizontally stator rings 34 mounted on the shell wall in every section and rotor discs 35 in the compartments enclosed between the successive pairs of adjacent stator rings, in every compartment one rotor disc transversely mounted on a vertical shaft 36. There are means 37, 38 and 39 for the introduction of liquids and means 40, 41 and 42 for the removal of material. There may be settling zones 43 and 44 devoid of stator rings and rotor discs at the top of the reacting and crystallization section 31 and at the bottom of the washing section.

The presence of a diluting section is useful if it is feared that on direct introduction of the reactive ingredients in the reaction zone the diluting effect of mixing the reactive ingredients with the bulk of the liquid mixture present in the reaction zone, should be insufficient to avoid the formation of large amounts of nuclei. If instead one of the reactive ingredients is introduced in the diluting section it is diluted there with ascending washing liquid and homogeneously mixed therewith before entering in the reaction zone.

The number of compartments in each of the three connecting cylindrical shells is usually between 3 and 25. The relative proportion between the diameter of the highest cylindrical shell and the diameter of the lowest cylindrical shell is usually between 2:1 and 5:1. Other relative proportions of dimensions of the apparatus comprising three cylindrical shells are as indicated hereinbefore for the apparatus comprising two cylindrical shells.

Very important among the applications of the invention is the application in the conversion of crude phosphates with sulphuric acid into phosphoric acid and gypsum.

As is well known, the said conversion is effected at temperatures of about 90°–110°C in order to obtain phosphoric acid of high concentration; the calcium sulphate is obtained in that case as hemihydrate. It is also known that this hemihydrate is in better conditions for being filtrated if the crude phosphate is first dissolved in phosphoric acid obtained previously and sulphuric acid is added subsequently. The hemihydrate obtained under such conditions still contains $P_2O_5$, which is removed by recrystallizatiaon of the hemihydrate to dihydrate.

In accordance with the invention the conversion of crude phosphates with sulphuric acid is carried out in an apparatus as represented in FIG. 1. Shell 1 contains a liquid mixture in which crystals of calcium-sulphate hemihydrate are suspended. A solution containing calcium and phosphate ions is introduced through inlet port 14. Through inlet ports 15 sulphuric acid is introduced. Within shell 1 a reaction between calcium and sulphate ions results. Freshly formed hemihydrate crystallizes on the existing crystal surfaces, so that the crystals grow. Fine crystals of hemihydrate are lifted initially with the ascending currents, but many of these crystals after having grown sufficiently, start to sink. The most favourable conditions are obtained at a solid content at the bottom in shell 1 between 10 and 20 vol.%, for instance 15 vol.%, i.e., 400 grams of solid per litre. Crystals attaining settling zone 12 start to sink therein as a result of the velocity of the ascending liquid in that space being smaller and the flow pattern quieter. Through opening 20 a clear solution of phosphoric acid is discharged. This phosphoric acid may serve for the dissolving of crude phosphate, but preferably for this purpose use is made of a liquid which is drained off through opening 21, which liquid still contains fine crystals of hemihydrate. An amount of phosphoric acid sufficient for the dissolution of the entire intake of crude phosphate, must circulate and is reintroduced into shell 1 through inlet port 14. The recirculated fine crystals of hemihydrate act as nuclei (seed crystals) in shell 1.

The crystals leaving shell 1 through connecting piece 3 are coarse and uniform in size and also very pure. This product is easily washed and concentrated in shell 2 in an ascending current of water or dilute sulphuric acid introduced through inlet port 16. The washed crystals concentrate in the settling zone 13 and are removed through discharge opening 17.

The process described yields phosphoric acids of any desired concentration up to 55 percent by weight of $P_2O_5$ without evaporation of water being necessary. The gypsum obtained from the calcium sulphate hemihydrate by recrystallization can be used in wet condition without further purification for the preparation of first quality plaster and also for conversion into ammonium sulphate and calcium carbonate. After drying and calcining it may be applied as admixture to cement and for the preparation of cement clinker and sulphuric acid.

A second very attractive application of the invention is found in the preparation of sodium silicofluoride according to the equation:

Although this process may be carried out very well in an apparatus as shown in FIG. 1, preferably an apparatus as shown in FIG. 3 is used. The following details refer to FIG. 3.

NaCl is dissolved in a mother lye previously obtained in this process and is introduced into section (or shell) 31 through line 37, in order to react with $H_2SiF_6$. A solution of $H_2SiF_6$ is introduced into section (or shell) 32 through line 38. It is diluted in section 32 by washing liquid rising from section (or shell) 33 and transported by the rising current to section 31. $Na_2SiF_6$ crystallizing in section 31, is classified in the upward currents which entrain the finer crystals. Once crystals of $Na_2SiF_6$ sink in countercurrent with washing liquid through sections 32 and 33, settle in settling zone 44 and are removed through discharge line 40. Water is introduced into section 33 through line 39. Mother lye still containing fine crystals of $Na_2SiF_6$ is drained off from shell 31 through line 42. It is used for dissolving NaCl and reintroduced into section 31 through line 37. Dilute hydrochloric acid which may contain the excess of NaCl applied, if any, is discharged through an overflow and discharge line 41.

As a third application of the invention the application in the so-called Somet-process may be mentioned. (Sondershausen Methanol Process, H. Hoppe, "A new method for the production of chlorine-free potash fertilizers," Proc. of the XVIIth International Congress "Chemistry Days 1966" on Chemical Fertilizers, Milan, pp. 121–132). In this process potassium sulphate is prepared by conversion of KCl with $MgSO_4$ in water in two reaction steps:

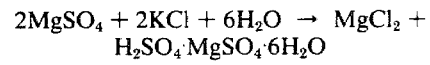

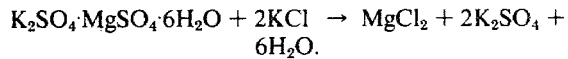

In the last step methanol is added to the solution to decrease the solubility of $K_2SO_4$. Instead of methanol also ethanol, dioxan, acetone and other organic liquids may be used.

Figure 4:
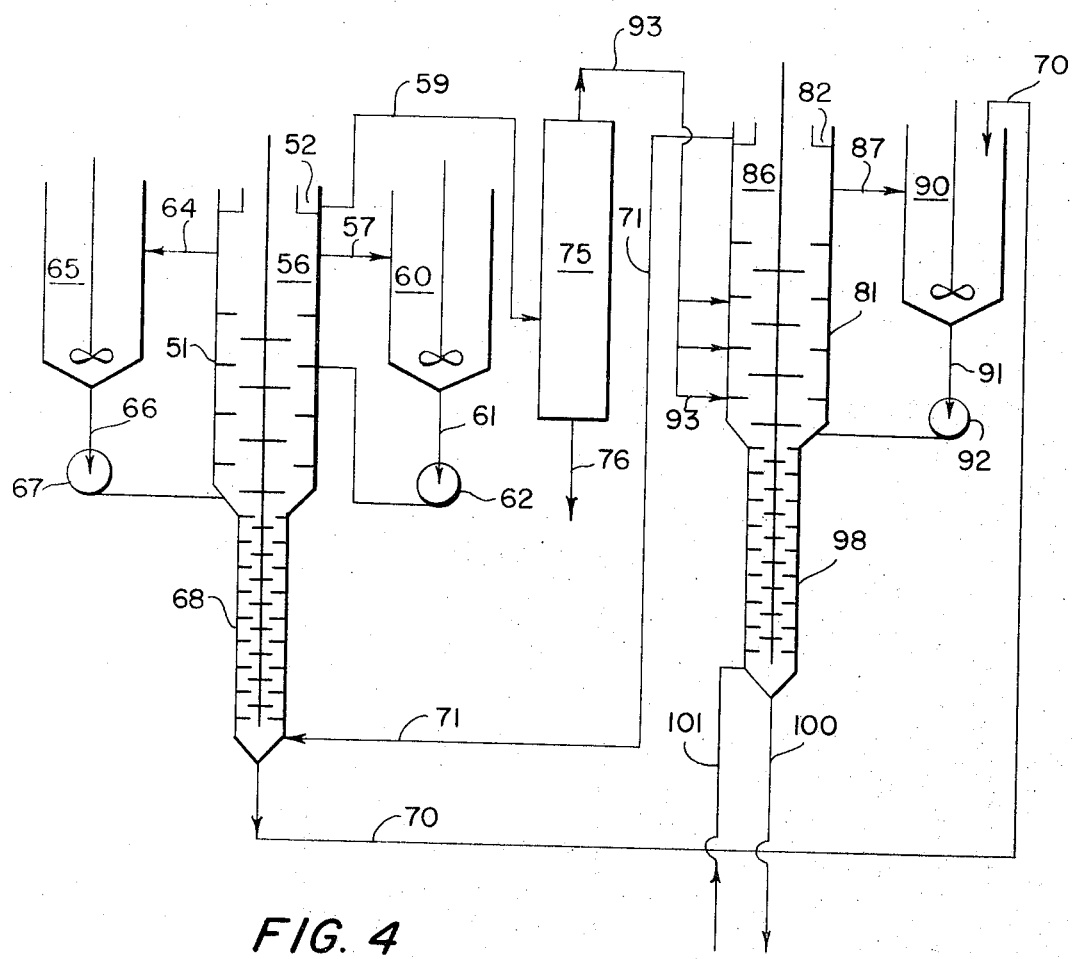
FIG. 4 is a schematic diagram relating to a special application of the invention.

The apparatus according to the present invention may be used in either step of the Somet process as is described hereinfurther with reference to FIg. 4. In addition to the apparatus of the invention this Figure also shows auxiliary equipment. In the first step a rotating disc contactor with a wider section 51 and a narrower section 68 is used, from which at the top mother lye is discharged through lines 57 and 64. Line 57 leads to vessel 60, in which KCl is dissolved. The solution obtained in vessel 60 is introduced into section 51 through line 61 with pump 62. Line 64 leads to vessel 65, in which $MgSO_4·6H_2O$ is dissolved. The solution obtained here is transported to section 51 through line 66 with pump 67. From section 51 crystalline schoenite ($K_2SO_4·MgSO_4·6H_2O$) sinks into section 68 and is washed therein with a mother lye containing an organic liquid, for instance, methanol, which mother lye is obtained in the second step of the process. This mother lye is introduced into section 68 through line 71.

A schoenite suspension is transported from section 68 through line 70 to vessel 90, in which the KCl and (through line 87) a mother lye discharged from the top of the wider section 81 of the second rotating disc contactor are introduced. The solution obtained in vessel 90 at increased temperature (for instance, 50°–90°C) is transported through line 91 with pump 92 to the bottom of section 81, in which also the organic liquid, for instance methanol, is introduced through lines 93. As a result of the presence of methanol $K_2SO_4$ crystallizes and sinks down to the narrower section 98 of the second rotating disc contactor in which washing water ascends introduced through line 101. $K_2SO_4$ is removed as a product through line 100.

At the top of section 81 there is a settling zone 86 (devoid of stator rings and rotor discs), in which fine crystals of $K_2SO_4$ may sink. From settling zone 86 mother lye flows over a rim into a circular overflow gutter 82 and from there through line 71 to section 68 of the first rotating disc contactor. At the top of section 51 a settling zone 56 is provided (devoid of stator rings and rotor discs), in which fine crystals of schoenite may sink. From settling zone 56 mother lye containing methanol flows over a rim into a circular overflow gutter 52 and from there through line 59 to the distillation column 75. From the distillation column 75 a mother lye free from methanol and containing mainly $MgCl_2$ and water is discharged through line 76. Concentrated methanol (for instance, 85–90 percent by weight) is discharged from column 75 through line 93 leading to section 81.

It is evident that by the application of the invention in this conversion process a considerable simplification is achieved, since various filters and storing tanks are dispensed with.

A fourth application of the invention is in another known process also for the preparation of $K_2SO_4$ (L. Cavalli and M. Maggiore, Industrial and technical aspects of the recovery of potash by means of syngenite, Proceedings of the XVIIth International Congress "Chemistry Days 1966" on Chemical Fertilizers, Milan, pp. 171–177). In this process kainite ($K_2SO_4$, $MgSO_4 \cdot MgCl_2 \cdot 6H_2O$) is first converted into schoenite by treating it with a mother lye obtained elsewhere in the process. The schoenite is separated off and extracted with a warm solution of $K_2SO_4$ in water, so that crystalline $K_2SO_4$ is obtained and the mother lye just mentioned is remaining, which after cooling is contacted with kainite. After being separated from the schoenite the liquid still contains about 30 percent of the potassium present in the initial kainite. In order to recover the last-mentioned potassium gypsum (dihydrate) is added which causes syngenite ($CaSO_4 \cdot K_2SO_4 \cdot H_2O$) to crystallize. From the syngenite after separating it off, a solution of $K_2SO_4$ may be obtained by extraction with hot water. This last solution serves for the extraction of the schoenite. The various steps constituting this process including the extraction and the washing of crystals can advantageously be carried out in accordance with the present invention.

As further examples of processes in which a separation is obtained by crystallization and the invention may be advantageously applied, may be mentioned:

Manufacture of pigments with aftertreatment of precipitates.

Preparation of $(NH_4)_2SO_4$ from gypsum, $NH_3$ and $CO_2$, in which $CaCO_3$ is wanted in coarsely crystalline condition for being easily washed out and separated off.

The preparation of mono-ammonium phosphate from crude phosphoric acid and ammonia, in which process often hardly filterable and washable precipitates of complex iron and aluminum phosphates are produced. The rotating disc contactor of the present invention is very suitable to agglomerate such precipitates as a result of which they obtain a sufficient velocity of settling, so that they can be washed in countercurrent. The washing is of great practical importance in view of preparation of other pure phosphates (for instance, sodium phosphate and sodium polyphosphate) from the ammonium phosphate.

Preparation of $NH_4F$ from a solution of $H_2SiF_6$ and $NH_3$ with $SiO_2$ precipitating.

EXAMPLE I

Conversion of Kola Phosphate with Sulphuric Acid into Phosphoric Acid and Calcium Sulphate Hemihydrate As an initial material Kola phosphate with 50 percent by weight of CaO and 35 percent by weight of $P_2O_5$ was used. 20 kg of this Kola phosphate were converted every hour for which 17½ kg $H_2SO_4$ were necessary. Use was made of an apparatus as shown in FIG. 1.

The phosphoric acid produced was discharged in part through opening 20 and for the rest drained off through opening 21 to be recirculated to inlet port 14 (recirculation line not shown). The recirculating phosphoric acid was used for dissolving the Kola phosphate in a vessel (not shown) inserted in the recirculation line.

A concentrated suspension of calcium sulphate hemihydrate is removed from the apparatus through line 18, leading to an apparatus (not shown) in which the hemihydrate is recrystallized to dihydrate. From the last-mentioned apparatus a stream of liquid flows back which is introduced into the rotating disc contactor through inlet port 16.

Water, sulphuric acid and phosphoric acid in quantities equal to those that are discharged with the suspension through line 18, are reintroduced through inlet port 16. Also an extra quantity of water is introduced through inlet port 16 which is equal to the consumption of water. The water consumed is the quantity of water removed from the process as a diluting component of the phosphoric acid and as crystal water in the hemihydrate. From this amount the quantity of water introduced into the process with the sulphuric acid (with 98 percent sulphuric acid: 2 percent water) should be subtracted. The extra quantity of water introduced through inlet port 16 may be used previously for washing the dihydrate when this is separated off by filtration or centrifugation.

Also part of the amount of sulphuric acid necessary for the conversion can be added through inlet port 16. The rest of the sulphuric acid is supplied through inlet ports 15.

In the table hereunder data of experiments leading to phosphoric acid of two concentrations either pure or containing some sulphuric acid are collected.

The liquid at the bottom of shell 2 in any case contained 10 percent by weight of $P_2O_5$ and 15 percent by weight of $H_2SO_3$. The temperature in shell 1 was 105°C and in shell 2 on the average 85°C.

TABLE I

|  | A | B | C | D |
|---|---|---|---|---|
| $P_2O_5$ in phosphoric acid produced ) %wt calculated on | 40 | 40 | 50 | 50 |
| $H_2SO_4$ in phosphoric acid produced) $H_3PO_4+H_2O$ | 0 | 2 | 0 | 2 |
| Consumption of water, kg/h | 9.45 | 9.45 | 5.95 | 5.95 |
| Quantity of $H_2SO_4$ supplied through inlet ports 15, kg/h | 15.14 | 15.49 | 16.12 | 16.40 |
| Quantity of $H_2SO_4$ supplied through inlet port 16, kg/h | 2.36 | 2.36 | 1.38 | 1.38 |
| Quantity of CaO that dissolves in acid recirculated from opening 21 into inlet port 14, together with quantity of CaO that is converted into $CaSO_4$ in the recirculating line, calculated in %wt on the acid | 4.0 | 5.14 | 3.0 | 4.14 |
| Quantity of acid recirculated, kg/h | 250.0 | 195.0 | 333.0 | 242.0 |
| CaO, dissolved in recirculating acid, kg/h | 10.0 | 7.80 | 10.0 | 7.24 |
| CaO, precipitated as hemihydrate in recirculating line, kg/h | 0 | 2.20 | 0 | 2.76 |

TABLE I—Continued

|  |  | A | B | C | D |
|---|---|---|---|---|---|
| Dimensions of the apparatus |  |  |  |  |  |
| shell 1 | (length without settling zone 12, cm | 70 | 70 | 70 | 70 |
|  | (diameter of shell, internally, cm | 25 | 25 | 35 | 35 |
|  | (number of compartments) | 7 | 7 | 10 | 10 |
|  | (diameter stator rings, internally, cm | 20 | 20 | 28 | 28 |
|  | (diameter rotor discs, cm | 15 | 15 | 22 | 22 |
| shell 2 | (length, cm | 23 | 23 | 36 | 36 |
|  | (diameter of shell, internally, cm | 10 | 10 | 10 | 10 |
|  | (number of compartments | 7 | 7 | 11 | 11 |
|  | (diameter stator rings, internally, cm | 7 | 7 | 7 | 7 |
|  | (diameter rotor discs, cm | 6 | 6 | 6 | 6 |
| Height of settling zone 12, cm |  | 30 | 30 | 30 | 30 |
| Stirring speed, rotation per minute |  | 200 | 200 | 200 | 200 |
| Relative proportion of velocities of flow shell 1/shell 2 |  | 3 | 2.3 | 3 | 2.2 |

EXAMPLE II

Preparation of Sodiumsilicofluoride (150 kg/h)

The apparatus is schematically represented by FIG. 3. In FIG. 3 $H_2SiF_6$ is reacted with NaCl in shell (section) 31. The precipitated $Na_2SiF_6$ sinks down from shell (section) 31 successively through shell (section) 32 and shell (section) 33, which serve for washing out the $Na_2SiF_6$. Through line 38, 460 kg of 25 percent wt solution of $H_2SiF_6$ in water are supplied at the bottom of section 32. 360 kg of washing water are introduced every hour at the bottom of shell 33 through line 39. The $Na_2SiF_6$ produced is discharged through line 40.

A part of the mother lye ascends from section 31 into settling zone 43, which is devoid of rotor discs and stator rings and in which the fine crystals present can sink down. Mother lye that is free from crystals is discharged at 41 through a circular overflow gutter with discharge line (composition: 345 kg of water from the solution of $H_2SiF_6$, 360 kg of washing water, 58kg of HCl, 16 kg of NaCl, together 779 kg, specific weight 1.15).

Mother lye (1,530 litre per hour), that still contains fine crystalline $Na_2SiF_6$ is removed from section 31 through line 42 to be recirculated and reintroduced into section 31 through line 37. In the recirculating liquid 110 kg of NaCl are dissolved every hour.

The concentrated solution of $H_2SiF_6$ introduced through line 38 is diluted with washing water in order to avoid high concentrations of the $SiF_6$-ion; to this end the solution was introduced into the apparatus at a point at which the concentration of sodium ions had decreased already so far that at that spot no $Na_2SiF_6$ could precipitate. The speed of stirring in all sections amounted to 120 rpm.

TABLE II

| Dimensions (cm) | section 31 | section 32 | section 33 | settling zone |
|---|---|---|---|---|
| Diameter (internally) | 90 | 40 | 25 | 90 |
| Diameter of stator rings (internally) | 63 | 28 | 17.5 | — |
| Diameter of rotor discs | 40 | 20 | 13 | — |
| Height of compartments together | 140 | 87.5 | 70 | — |
| Height |  |  |  | 50 |
| Number of compartments | 7 | 7 | 7 | — |

I claim as my invention:

1. An apparatus for producing crystalline precipitates by interaction of ions contained in miscible solutions and for washing the crystalline precipitates so obtained, which comprise: a rotating disc contactor having a first substantially cylindrical shell that defines a crystallization section and a second substantially cylindrical shell that defines a washing section, said first shell having a larger internal diameter than said second shell and being narrower at its bottom so as to fit to the top of said second shell, the bottom of said first shell and the top of said second shell being in open connection with each other; a plurality of annular, stationary baffles mounted in each of said two cylindrical shells extending from each respective shell wall to a central opening and dividing the space within said shells into a series of compartments; a rotor shaft extending axially with respect to both said shells through said openings; a plurality of disc-like rotor baffles transversely fixed to said shaft, each rotor baffle being within one of said compartments and displaced a substantial distance axially from the stationary baffles thereof; means for introducing fluid into said first shell and into said second shell; means for discharging material at the bottom of said second shell and in the upper region of said first shell; and means for rotating said rotor shaft and rotor baffles.

2. An apparatus for producing crystalline precipitates by interaction of ions contained in miscible solutions and for washing the crystalline precipitates so obtained, which comprise: a rotating disc contactor having a first substantially cylindrical shell that defines a crystallization section and a second substantially cylindrical shell that defines a washing section, said first and second shells being substantially vertically arranged with said first shell being above said second shell, said first shell having a larger internal diameter than said second shell and being narrower at its bottom so as to fit to the top of said second shell, the bottom of said first shell and the top of said second shell being in open connection with each other; a plurality of annular, stationary baffles mounted in each of said two cylindrical shells extending from each respective shell wall to a central opening and dividing the space within said shells into a series of compartments; in each of said shells a plurality of disc-like rotor baffles transversely fixed to a shaft, each rotor baffle being within one of said compartments and displaced a substantial distance axially from the stationary baffles thereof; means for introducing fluid into said first shell and into said second shell; means for discharging material at the bottom of said second shell and in the upper region of said first shell, and means for rotating said shaft and rotor baffles.

3. A rotating disc contactor according to claim 1, further comprising an extension of the wider shell beyond and above the highest situated annular stationary baffle, the extension being devoid of stationary as well as rotor baffles.

4. A rotating disc contactor according to claim 2, further comprising an extension of the wider shell beyond and above the highest situated annular stationary baffle, the extension being devoid of stationary as well as rotor baffles.

5. A rotating disc contactor according to claim 1, wherein the internal diameter of the wider shell is between two and five times the internal diameter of the narrower shell.

6. A rotating disc contactor according to claim 2, wherein the internal diameter of the wider shell is between two and five times the internal diameter of the narrower shell.

7. A rotating disc contactor according to claim 2, wherein the annular stationary baffles extend substantially horizontally.

8. A rotating disc contactor according to claim 2, wherein the rotor baffles in each compartment are located approximately halfway between the stationary baffles.

9. A rotating disc contactor according to claim 1, wherein the diameter of the rotor baffles within each shell is smaller than the inner diameter of the annular stationary baffles in that shell and the diameter of all rotor baffles is smaller than the inner diameter of the annular stationary baffles in the wider shell.

10. An apparatus for producing crystalline precipitates by interaction of ions contained in miscible solutions and for washing the crystalline precipitates so obtained, which comprise: a rotating disc contactor comprising three substantially cylindrical shells of different diameter arranged substantially vertically and in vertical succession, the diameters of the successive shells increasing with the height of their location, each higher located shell narrowing at its bottom to fit to the top of the narrower shell underneath; a plurality of annular stationary baffles mounted in each of said cylindrical shells, extending from the shell wall to a central opening and dividing the space within said shells into a series of compartments; in each of said cylindrical shells, a plurality of disc-like rotor baffles each located inside one of said compartments and transversely mounted on a substantially vertical shaft; in each shell means for the introduction of liquid; means for discharging material from the bottom of the narrowest shell and from the top region of the widest shell; and means for rotating said shaft and rotor baffles.

* * * * *